US009304581B1

(12) United States Patent
Robillard

(10) Patent No.: US 9,304,581 B1
(45) Date of Patent: *Apr. 5, 2016

(54) PROGRAMMABLE AVAILABILITY FOR A HIGH AVAILABILITY STORAGE SYSTEM

(71) Applicant: EMC Corporation, Hopkinton, MA (US)

(72) Inventor: Michael Robillard, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 150 days.

This patent is subject to a terminal disclaimer.

(21) Appl. No.: 13/932,668

(22) Filed: Jul. 1, 2013

Related U.S. Application Data

(63) Continuation of application No. 12/241,200, filed on Sep. 30, 2008, now Pat. No. 8,504,857.

(51) Int. Cl.
G06F 1/00 (2006.01)
G06F 1/32 (2006.01)
(52) U.S. Cl.
CPC .................................. G06F 1/3287 (2013.01)

(58) Field of Classification Search
CPC ..... G06F 1/3287; G06F 1/3206; G06F 1/3234; G06F 3/0625; G06F 3/0634
See application file for complete search history.

(56) References Cited

U.S. PATENT DOCUMENTS

| 2002/0054477 A1* | 5/2002 | Coffey et al. ................ 361/686 |
| 2004/0027751 A1* | 2/2004 | Goerke et al. ................ 361/90 |
| 2005/0080964 A1* | 4/2005 | Colvig et al. ................ 710/200 |
| 2008/0184059 A1* | 7/2008 | Chen ................................ 714/4 |
| 2009/0031154 A1* | 1/2009 | Ikawa et al. .................. 713/320 |

* cited by examiner

Primary Examiner — Nimesh G Patel
(74) Attorney, Agent, or Firm — Schmeiser, Olsen & Watts LLP

(57) ABSTRACT

Storage systems include a plurality of enclosures interconnected to provide a network. Each enclosure includes a first power supply module, a redundant power supply module, a first electronics module, and a redundant electronics module in electrical communication with the first electronics module and providing redundant functionality of the first electronics module. Each of the modules of each enclosure is individually associated with a separate power profile dedicated to that module. The power profile of each given module includes one or more programmable power parameters that determine when to power down and power up that given module during operation of the storage system.

21 Claims, 2 Drawing Sheets

PROGRAMMABLE AVAILABILITY FOR A HIGH AVAILABILITY STORAGE SYSTEM

RELATED APPLICATION

This application is a continuation application of co-pending U.S. patent application Ser. No. 12/241,200, titled "Programmable Availability for a High Availability System," filed Sep. 30, 2008, the entirety of which is incorporated by reference herein.

FIELD OF THE INVENTION

The present invention relates generally to storage systems. More particularly, the present invention relates to systems and methods for reducing power consumption in a storage system.

BACKGROUND

Storage systems are frequently categorized according to their availability, a term that refers to the ability of users and their applications to access the storage system. A storage system is considered unavailable if a user application cannot access the storage system, for example, to read or write information. Mission-critical applications, for example, financial transactions, medical care, nuclear power operations, require a high level of availability of their systems. Users of such high availability systems are generally intolerant of system unavailability and generally require an absolute degree of operational continuity during a specified period. For other types of applications, availability is certainly expected, but not critical; users of low availability systems possess a degree of tolerance for unavailability. However, low availability systems experiencing excessive downtime or performing poorly can fail the expectations of their users. Often, service level agreements specify the expected level of availability, thereby establishing metrics against which actual performance of the system may be measured.

Storage systems designed for high availability generally implement redundancy at various systems levels: for example, redundant storage processors, redundant power supplies, redundant link control cards, redundant arrays, and redundant Fibre Channel loops. In general, purchasers are able to specify the level of redundancy of a storage system only at the time of its purchase. These purchasers often have in mind at the time of purchase the highest level of availability that will be required of their storage systems, and therefore initially configure the redundancy of their storage systems to satisfy that anticipated level. Often, though, users of the storage systems do not require this high level of availability around-the-clock for every day of the week and every day of the year.

In addition, data centers are continuously growing larger, with their storage systems ever expanding in number and in storage capacity. Usually, the data centers configure their storage systems to operate at optimized input/output (I/O) performance and system response time. Often, though, little or no consideration is given to managing the overall power consumption of the storage system. Thus, the storage systems run continuously at their maximum power consumption. This continuous operation increases the total power dissipated and, consequently, the cost of ownership to the data centers.

SUMMARY

In one aspect, the invention features a storage enclosure comprising a first electronics module, a second electronics module configured to provide redundant functionality to the first electronics module, a first power supply module associated with the first electronics module, and a second power supply module associated with the second electronics module and configured to provide redundant functionality to the first power supply module. Each of the first and second electronics modules and each of the first and second power supply modules is individually associated with a separate power profile dedicated to that module. The power profile of each given module includes one or more programmable power parameters that determine when to power down and power up that given module during operation of the storage enclosure.

In another aspect, the invention features a storage system comprising a plurality of enclosures interconnected to provide a network. Each enclosure includes a first power supply module, a redundant power supply module, a first electronics module, and a redundant electronics module in electrical communication with the first electronics module to provide redundant functionality to the first electronics module. Each of the modules of each enclosure is individually associated with a separate power profile dedicated to that module. The power profile of each given module includes one or more programmable power parameters that determine when to power down and power up that given module during operation of the storage system.

In still another aspect, the invention features a method for reducing power consumption in a storage system including one or more enclosures interconnected to form a network. Each enclosure includes a first power supply module, a redundant power supply module, a first electronics module, and a redundant electronics module in electrical communication with the first electronics module and providing redundant functionality of the first electronics module. The method comprise individually associating each module of each enclosure with a separate power profile dedicated to that module, and powering down and restoring power to each module at appropriate moments determined by settings of one or more programmable power parameters of the power profile individually associated with that module.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In many high availability storage systems, the level of availability required by applications varies over time. To capitalize on this recognition that redundancy is not required at all times, systems constructed in accordance with the invention implement programmable availability as a mechanism to reduce their availability temporarily and reliably in order to reduce system power consumption.

In brief overview, an administrator of a data center establishes a power policy (i.e., a power conservation strategy) that defines which and when redundant modules of a storage array are to be powered down. Through an application program executing at a host device (or an external control station) in communication with the storage system, the administrator configures select redundant modules to power down at certain moments in order to achieve the objectives of the power policy. In one embodiment, the storage system is preprogrammed to act independently to power down the select redundant modules using an algorithm based upon time of day, workload, etc. At the appropriate moments programmed by the administrator, each configured redundant module powers down, thereby reducing the availability of the storage array in order to reduce power consumption of the storage system. The result is lower cost of ownership to the customer.

For some redundant modules that are powered down, power continues to be supplied to a minority portion of the electronics of the redundant module. This minority portion includes a controller that continues to communicate with its active counterpart module while the redundant module is powered down. If the controller of the redundant module detects that the active counterpart module has or is becoming unavailable, power is restored to the redundant module, returning it to normal operation and readying it to assume the active role of the module pair.

Figure 1:
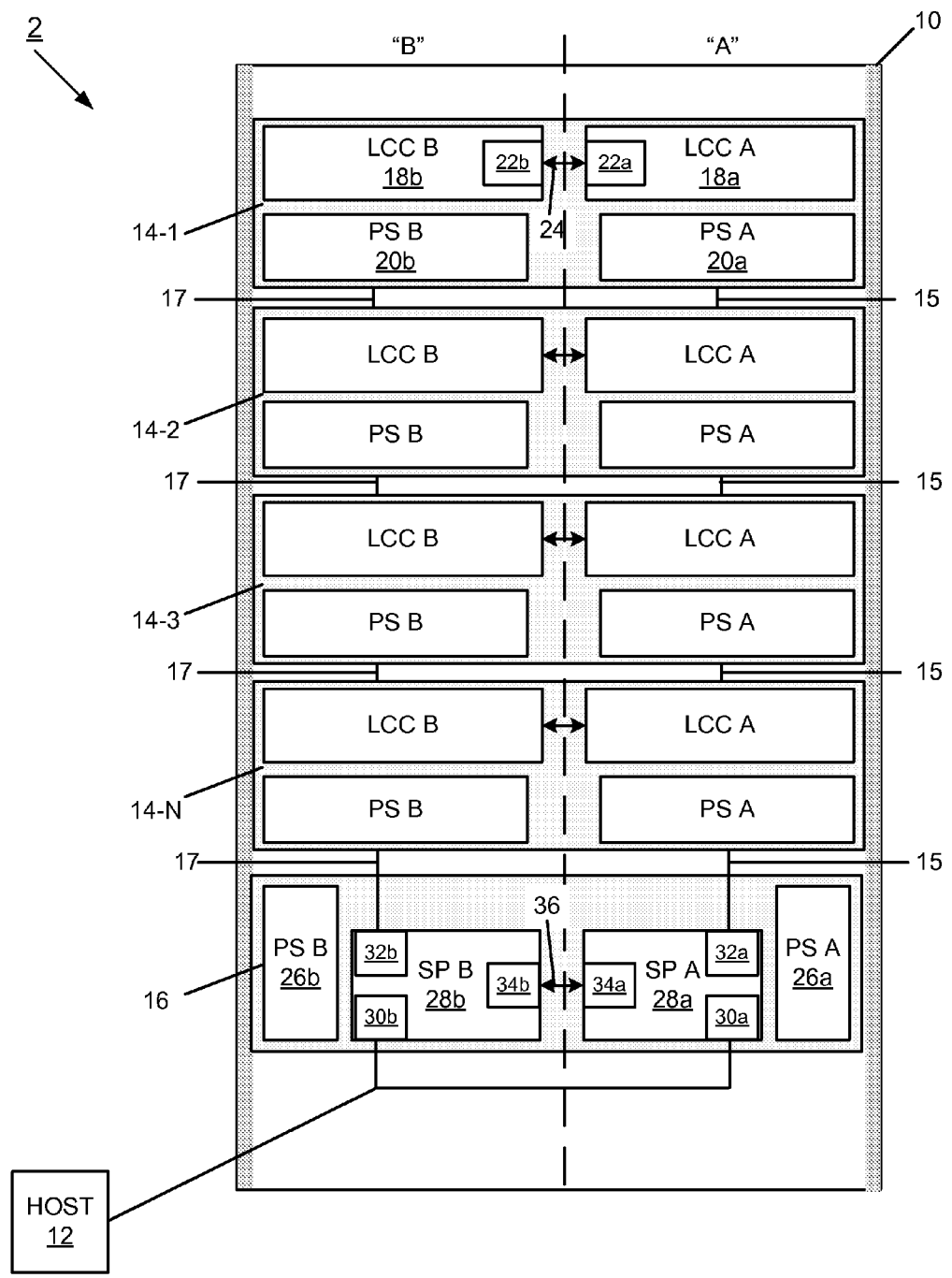
FIG. 1 is a diagram of an embodiment of a high availability storage system implementing power conservation in accordance with the invention.

FIG. 1 shows an embodiment of a system 2 configured to conserve power in accordance with the invention. The system 2 includes a host system 12 in communication with a high availability storage array 10. Although described primarily with respect to a single host system 12 and a single storage array 10, the principles of the invention extend also to storage systems with multiple hosts and multiple storage arrays. Exemplary implementations of the storage array 10 include Symmetrix® and CLARiiON® storage arrays; both produced by EMC Corp. of Hopkinton, Mass.

The storage array 10 includes a plurality of enclosures, including disk array enclosures 14-1, 14-2, 14-3, 14-n (generally, DAE 14) in communication with a storage processor enclosure 16. The enclosures 14, 16 of the system 2 need not physically be in the same rack, but can be in separate racks. The principles of the invention extend to other types of enclosures, for example, blade servers.

The enclosures 14, 16 of the system 2 communicate over redundant backend networks (also referred to as a backend). In general, a backend is a communication network by which the enclosures 14, 16 can exchange communications (e.g., commands, messages, data, etc.) with each other. Topologies for backend networks vary. In one embodiment, each backend has a loop topology. Communication signals traverse a given loop in one direction and pass from enclosure to enclosure in a daisy-chain fashion. Enclosures receiving communication signals targeted for another enclosure forward those signals along the loop. Partitioned into an "A" side and a redundant "B" side, each enclosure 14, 16 has redundant backend loops. One loop (represented by signal lines 15) includes the "A" side of each enclosure 14, 16 and the other loop (represented by signal lines 17) includes the "B" side of the each enclosure 14, 16. The present invention is not limited to the type of backend implemented (different topologies, for example, token rings and Ethernet, can be implemented instead).

Each DAE 14 includes a plurality of physical disk modules (not shown) for storing data. In general, a disk module includes a carrier assembly that holds a disk drive and slides into the enclosure 204. Applications for the disk modules include, for example, JBOD (Just a Bunch Of Disks), RAID (Redundant Array of Independent Disks), and SAN (Storage Area Network). The storage array 10 presents the physical disks of the DAEs 14 to the host system 12 as logical volumes, called LUNs, originally a SCSI (small computer system interface) term, now commonly used to describe a logical unit of physical storage space.

With reference to the DAE 14-1 as a representative example of disk array enclosures, each DAE 14 includes a link control card module 18a and power supply module 20a on its A side, and a redundant link control card module 18b and redundant power supply module 20b, on its B-side. Each link control card module 18a, 18b (generally, LCC module 18) has a controller 22a, 22b (generally, 22) respectively. The controllers 22 communicate over a bus 24, as described in more detail below.

Although this embodiment is illustrated primarily with link control cards, it is to be understood that the principles of the invention apply to any other type of enclosure card or board which performs a logic or control function and communicates with the other cards or processors, examples of which are bridge control cards, or BCCs, which are described in U.S. Pat. No. 6,829,658, issued to Beauchamp et al. on Dec. 7, 2004, the entirety of which is incorporated by reference herein.

The storage processor enclosure 16 includes a power supply module 26a and storage processor module 28a on its A side and a redundant power supply module 26b and redundant storage processor module 28b on its B side. Storage processor modules may also be known and referred to as storage processors, data movers, server blades, or just blades. Each storage processor module 28a, 28b (hereafter, processor module 28) includes a respective host adapter 30a, 30b for communicating with the host system 12, a respective disk adapter 32a, 32b, for communicating with the disks of the DAEs 14, and a respective controller 34a, 34b. The controllers 34a, 34b communicate with each other over a bus 36. Some embodiments of storage processor enclosures can also include disk modules and control card modules.

In general, any of the aforementioned modules described herein can be hot-pluggable, field-replaceable units (FRUs), that is, a circuit board, a subassembly, or subsystem that a user or technician can quickly and easily remove and replace within an electronics enclosure, often at the customer site.

In one embodiment, the present invention uses power profiles to program the availability of the storage array 10. A separate power profile is associated with each module (i.e., power supply, LCC, and SP) in the storage array 10 and includes various programmable power parameters that may be set that control the power down and power up operation of the module. Examples of such programmable power parameters include, but are not limited to, a schedule parameter, an event trigger parameter, and a condition trigger parameter, as described in more detail below.

Different modules can be configured with different types of power profiles. Each power profile defines when the module with that power profile is powered up and powered down. General examples of types of power profiles include, but are not limited to, the following: (1) power is always on for the module; (2) power is turned off and on for the module in accordance with a timetable (or schedule); (3) power is turned off and on for the module upon the occurrence of and completion of an event; and (4) or power is turned off and on for the module upon the existence of a system condition. The second, third, and fourth examples of types of power profiles are appropriate when reduced availablility of the storage system 2 for certain periods is acceptable in order to achieve reduced power consumption.

Storage processors, LCCs, and power supplies that are to remain fully powered in the storage array 10, while other modules are powered down, are examples of modules that are configured with the first example type of power profile (i.e., "always on"). This type of power profile can be the default setting for each module when first installed in the storage array. These modules remain active and may continue to provide normal functionality to the users and their applications while other modules of the array 10 power down in accordance with the invention. Modules operating according to the first power profile do not conserve power.

The second example type of power profile, "scheduled off", is applied when certain modules can be taken offline (e.g., powered off), for example, on demand or on a schedule. As example applications of the "scheduled off" type of power profile, power can be turned off for each module with such a power profile during non-business days, such as Saturday, Sunday, and specified holidays, or between the hours of 12 PM and 6 AM of each business day. To configure a given module with the second type of power profile, the administrator activates (e.g., places a check in a checkbox) the schedule parameter and supplies the scheduling information (i.e., start and stop times and dates for when power is turned off and on).

The third example type of power profile, "trigger event", can be used when the power policy calls for certain modules to be powered down when a specified event occurs, for example, a particular host application program is running. For example, during a copy or move of data to a remote location, specific LCC modules (redundant or uninvolved in the data operation) and their associated power supply modules can be powered down. To configure a given module with the third type of power profile, the administrator activates the event trigger parameter and selects the particular event from a presented list of events.

The fourth example type of power profile, "trigger condition", can be used when the power policy calls for certain modules to be powered down when a specified condition in the storage array 10 is detected. For example, specific redundant LCC and SP modules and their associated power supply modules can be powered down when the workload of the storage system falls below a specified threshold. As another example, a redundant power supply (of a DAE or SPE) can be powered down when the required load can be serviced by a single power supply. To configure a given module with the fourth type of power profile, the administrator activates the condition trigger parameter, selects the particular condition from a presented list of conditions, and specifies any threshold value appropriate to the selected condition.

As used herein, "power off" and "power down" are equivalent modes of operation in that power to a majority portion of the electronics of the module is off, while a minority portion of the electronics continues to receive power. For LCC modules, the minority portion includes the controller 22; for the SPs, the minority portion includes the controller 34. When in any of these modes, any given module can be brought back online by explicit administrator actions or by I/O activity directed to that module.

Establishing the type of power profile for a particular module is achieved by setting the power parameters of the power profile for that module. These power parameters can be set in various manners, including, but not limited to: (1) by default upon initial configuration of the module; (2) by executing a host application program that presents an interface through which an administrator can manually access and modify the power parameters; or (3) by executing a host application (e.g., program code or script) that dynamically modifies the power parameter of the module during the application's execution.

Figure 2:
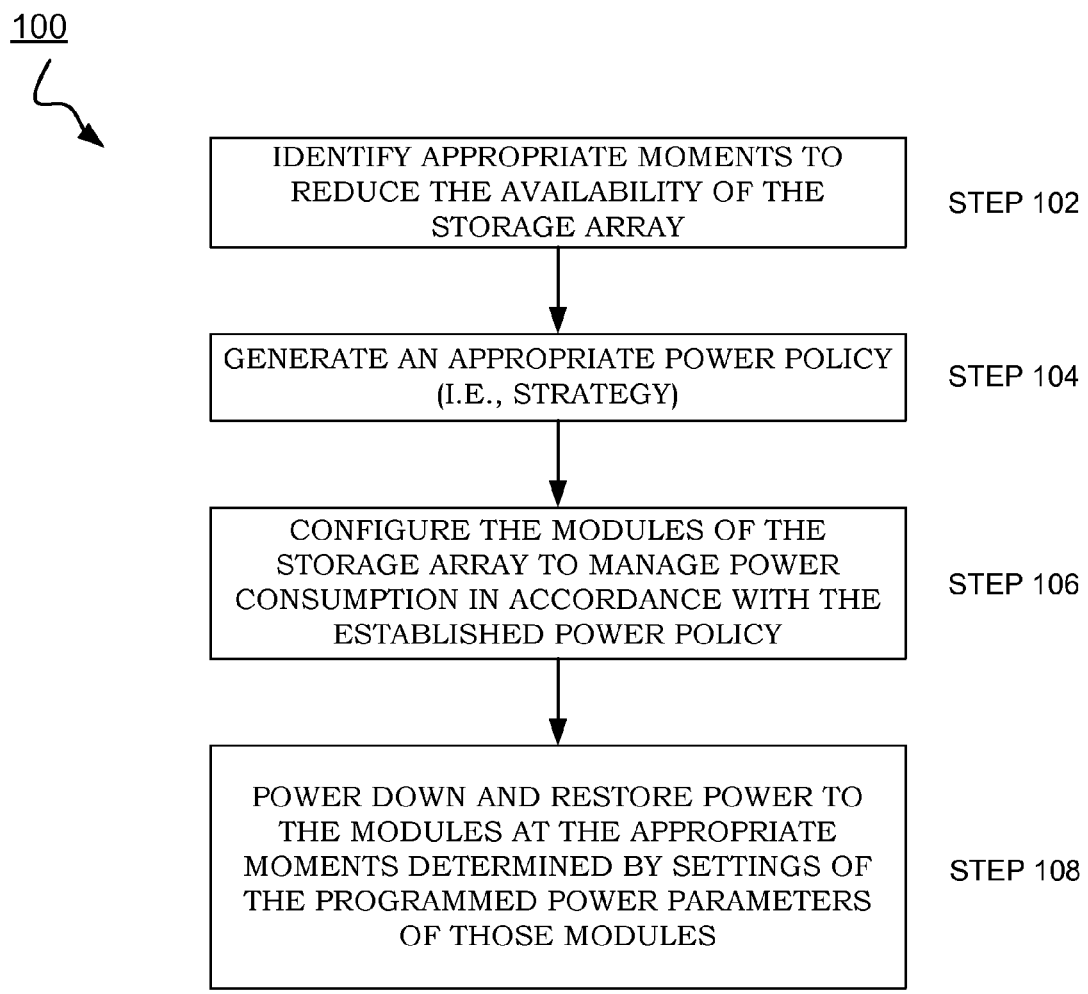
FIG. 2 is a flow diagram of an embodiment of a process for reducing power consumption by the high availability system in accordance with the present invention.

FIG. 2 shows an embodiment of a process 100 for managing the power consumption of the storage system 2. In the description of the process 100, reference is also made to FIG. 1. An administrator (for example) identifies (step 102) the appropriate moments for which to reduce the availability of the storage array 10 and generates (step 104) an appropriate power policy. For example, the administrator may decide that running redundant control card modules and redundant power supply modules is generally unnecessary on Sundays. In this example, the administrator can devise a power policy for turning off power to the redundant LCC module 18b and redundant power supply module 20b of each DAE 14 and restoring power to such modules at 6 AM of the following Monday morning.

The administrator, at the host system 12, runs an application program that presents a command line interface or a graphical user interface. Through this interface, the administrator configures (step 106) the power profiles of the various modules to manage power consumption in accordance with the established power policy. The interface can enable the administrator to access programmable power parameters for each of the modules individually and to set or assign values to the parameters accordingly to achieve the desired schedule for powering down and restoring power to that given module. To continue with the present example, through the interface the administrator accesses the power profile of each redundant LCC module 18b and each redundant power supply 20b individually, sets the programmable power parameters of the power profile to select the module for being powered down, and specifies the start and end dates and times for the power down period.

At the appropriate moments determined by settings of the programmable power parameters, the host system 12 may communicate (step 108) with the storage array 10 to cause select modules to power down or to have power restored. Communications pass from the host system 12 to the processor module 28b. The communications are forwarded over signal lines 17 to their intended LCC modules 18b. In another embodiment, the storage array 10 is preprogrammed to power down and to restore power to the select modules at the appropriate moments (i.e., the storage array acts at the appropriate moments without prompting from the host system 12). During the interims in which the LCC modules 18b and power supplies are powered down, such modules cease to provide redundant functionality to their counterpart modules, thereby reducing the availability of the storage array 10 during that interim in order to reduce power consumed by the storage array 10.

When a redundant module of an enclosure (i.e., a DAE 14 or an SPE 16) is powered down while its counterpart module remains active, the controller 22b, 34b of the redundant module continues to communicate with the controller 22a, 34a of its active counterpart module (over bus 24 or bus 36). In general, each controller 22, 34 periodically transmits to and receives a "heartbeat" signal from its counterpart controller. If the controller 22b, for example, fails to detect a heartbeat signal from its counterpart over a specified period, the controller 22b deems the active counterpart module to have faulted (e.g., because it has been removed from the enclosure). As a result, the controller 22b of the redundant module causes power to be restored so that the redundant module can assume active status in the enclosure (until the original active counterpart module can be restored to its pre-faulting state of operation).

Unlike the LCC modules and processor modules, the power supply modules of an enclosure do not exchange heartbeat signals over a bus. Accordingly, each control card (or processor) module monitors and relays the operational status of its active power supply to the controller of the redundant (powered down) control card (or processor) module. This information can be embodied within the heartbeat signals issued by the active control card module or issued as separate heartbeat signals. If the controller 22b of the redundant control card module, for example, determines from a received heartbeat signal that the active power supply has faulted, the controller 22b causes power to be restored to the redundant power supply so that the redundant power supply can assume active status.

Aspects of the present invention may be embodied in hardware, firmware, or software (i.e., program code). Program code may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and Visual C++.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented using hardware (digital or analog), firmware, software, or a combination thereof.

While the invention has been shown and described with reference to specific preferred embodiments, it should be understood by those skilled in the art that various changes in form and detail may be made therein without departing from the spirit and scope of the invention as defined by the following claims. For example, although described herein with respect to storage systems, it is to be understood that the principles of the invention apply also to other types of electronic systems that employ redundant modules to increase system availability. As another example, although described herein with respect to horizontal redundancy (i.e., redundant modules within a single enclosure), the principles of the invention also extend to vertical redundancy (i.e., redundant enclosures) and to rack redundancy (i.e., redundant racks).

What is claimed is:

1. A storage enclosure comprising:
   a first electronics module;
   a second electronics module configured to provide redundant functionality to the first electronics module;
   a first power supply module associated with the first electronics module; and
   a second power supply module associated with the second electronics module and configured to provide redundant functionality to the first power supply module, the second power supply module being a sole source of the redundant functionality of that enclosure;
   wherein each of the first and second electronics modules and each of the first and second power supply modules is individually associated with a separate power profile dedicated to that module, the power profile of each given module including one or more programmable power parameters that determine when to power down and power up that given module during operation of the storage enclosure, wherein a separate power profile associated with the second power supply module powers down the second power supply module during a copy or move of data from the storage enclosure to a remote location, wherein the separate power profiles of the first and second power supply modules comprise a trigger condition to individually power down the first and second power supply modules when a workload of the storage enclosure falls below a predetermined threshold.

2. The storage enclosure of claim 1, wherein the first electronics module includes a controller configured to monitor a status of the first power supply module and to send the status to the redundant second electronics module.

3. The storage enclosure of claim 2, wherein the second electronics module includes a controller configured to receive the status of the first power supply module from the controller of the first electronics module and to cause power to be restored to the second power supply module in response to determining from the status that the first power supply module has faulted.

4. The storage enclosure of claim 2, wherein the second electronics module includes a controller configured to receive periodically a heartbeat signal from the controller of the first electronics module while the second electronics module is powered down.

5. The storage enclosure of claim 4, wherein the heartbeat signal includes the status of the first power supply module.

6. The storage enclosure of claim 1, wherein the second power supply module is powered down while the first and second electronics modules remain active; and wherein the first power supply module supplies sufficient power to support a load of the first and second electronics modules while the second power supply module is powered down.

7. The storage enclosure of claim 1, wherein both the first and second electronics modules of the storage enclosure are link control cards or storage processor cards.

8. The storage enclosure of claim 1, wherein one or more of the power profiles define a schedule for powering down each module associated with the one or more of the power profiles.

9. The storage enclosure of claim 1, wherein one or more of the power profiles define an event, an occurrence of which triggers an appropriate moment to power down each module associated with the one or more of the power profiles.

10. The storage enclosure of claim 1, wherein one or more of the power profiles define a storage system condition, an existence of which causes each module associated with the one or more of the power profiles to power down.

11. A storage system comprising:
    a plurality of enclosures interconnected to provide a network, each enclosure including a first power supply module, a redundant power supply module, and a first electronics module, and a redundant electronics module in electrical communication with the first electronics module and providing redundant functionality of the first electronics module, the redundant power supply module being a sole source of the redundant functionality of that enclosure;
    wherein each of the modules of each enclosure is individually associated with a separate power profile dedicated to that module, the power profile of each given module including one or more programmable power parameters that determine when to power down and power up that given module during operation of the storage system, wherein a separate power profile associated with the redundant power supply module powers down the redundant power supply module during a copy or move of data from the storage enclosure to a remote location, wherein the separate power profiles of the first and redundant power supply modules comprise a trigger condition to individually power down the first and redundant power supply modules when a workload of the storage enclosure falls below a predetermined threshold.

12. The storage system of claim 11, wherein the first electronics module of a given enclosure includes a controller configured to monitor a status of the first power supply module of the given enclosure and to send the status to the redundant control card module of the given enclosure.

13. The storage system of claim 12, wherein redundant electronics module of the given enclosure includes a controller configured to receive the status of the first power supply module of the given enclosure from the controller of the first electronics module of the given enclosure and to cause power to be restored to the second power supply module of the given enclosure in response to determining from the status that the first power supply module of the given enclosure has faulted.

14. The storage system of claim 11, wherein the second electronics module of the given enclosure includes a controller configured to receive periodically a heartbeat signal from the controller of the first electronics module of the given enclosure while the second electronics module of the given enclosure is powered down.

15. The storage system of claim 14, wherein the heartbeat signal includes the status of the first power supply module of the given enclosure.

16. The storage system of claim 11, wherein the second power supply module of a given enclosure is powered down while the first and second electronics modules of the given enclosure remain active; and wherein the first power supply module of the given enclosure supplies sufficient power to support a load of the first and second electronics modules of the given enclosure while the second power supply module of the given enclosure is powered down.

17. The storage system of claim 11, wherein one or more of the power profiles define a schedule for powering down each module associated with the one or more of the power profiles.

18. The storage system of claim 11, wherein one or more of the power profiles define an event, an occurrence of which signals an appropriate moment to power down each module associated with the one or more of the power profiles.

19. The storage system of claim 11, wherein one or more of the power profiles define a storage system condition, an existence of which causes each module associated with the one or more of the power profiles to power down.

20. The storage system of claim 11, wherein a given one of the plurality of enclosures is a storage processor enclosure or a disk array enclosure.

21. A method for reducing power consumption in a storage system including one or more enclosures interconnected to form a network, each enclosure includes a first power supply module, a redundant power supply module, a first electronics module, and a redundant electronics module in electrical communication with the first electronics module and providing redundant functionality of the first electronics module, the method comprising:
    individually associating each module of each enclosure with a separate power profile dedicated to that module; and
    powering down and restoring power to each module at appropriate moments determined by settings of one or more programmable power parameters of the power profile individually associated with that module, wherein a separate power profile associated with the redundant power supply module powers down the redundant power supply module during a copy or move of data from the storage enclosure to a remote location, wherein the separate power profiles of the first and redundant power supply modules comprise a trigger condition to individually power down the first and redundant power supply modules when a workload of the storage enclosure falls below a predetermined threshold.

* * * * *